(12) United States Patent
Liang et al.

(10) Patent No.: US 11,346,646 B2
(45) Date of Patent: May 31, 2022

(54) THICKNESS DETECTOR DEVICE AND METHOD, DETECTOR SYSTEM AND SLOT DEVICE

(71) Applicants: CHONGQING BOE DISPLAY LIGHTING CO., LTD., Chongqing (CN); BOE TECHNOLOGY GROUP CO., LTD., Beijing (CN)

(72) Inventors: Rongdong Liang, Beijing (CN); Guoxin Liu, Beijing (CN); Yong Yang, Beijing (CN); Shijun Zhao, Beijing (CN); Ping Zhao, Beijing (CN)

(73) Assignees: CHONGQING BOE DISPLAY LIGHTING CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 378 days.

(21) Appl. No.: 16/613,105

(22) PCT Filed: Apr. 28, 2019

(86) PCT No.: PCT/CN2019/084853
§ 371 (c)(1),
(2) Date: Nov. 12, 2019

(87) PCT Pub. No.: WO2019/214480
PCT Pub. Date: Nov. 14, 2019

(65) Prior Publication Data
US 2021/0333081 A1  Oct. 28, 2021

(30) Foreign Application Priority Data

May 11, 2018 (CN) .......................... 201820708727.9

(51) Int. Cl.
*G01B 5/06* (2006.01)
*G08B 21/18* (2006.01)

(52) U.S. Cl.
CPC .............. *G01B 5/06* (2013.01); *G08B 21/182* (2013.01)

(58) Field of Classification Search
CPC ............ G01B 5/06; G08B 21/182; G02F 1/13
See application file for complete search history.

(56) References Cited

U.S. PATENT DOCUMENTS

2010/0328683 A1* 12/2010 Pan ........................ G01B 11/06
356/630
2011/0240738 A1* 10/2011 Mizawa ............. G06K 13/0887
235/449

(Continued)

FOREIGN PATENT DOCUMENTS

CN         104515450 A     4/2015
CN         105222673 A     1/2016
(Continued)

*Primary Examiner* — Ojiako K Nwugo

(57) ABSTRACT

A thickness detector device and method, a detector system and a slot device are provided, and the thickness detector device includes: a base, which has a side wall provided with a through slot that penetrates through the base; a slot component at the base and has n slots, n being an integer greater than 1, and a width of each slot being less than a width of the through slot; a driver component which is provided on the base, is in a fixed connection with the slot component, and is configured to change the slot that is in the slot component and is in communication with the through slot by driving the slot component to move.

20 Claims, 4 Drawing Sheets

(56) References Cited

U.S. PATENT DOCUMENTS

2012/0096731 A1* 4/2012 Wu .................. G01B 5/06
33/783
2013/0276526 A1* 10/2013 Wang ................ G01B 5/06
73/159

FOREIGN PATENT DOCUMENTS

| CN | 105371730 A | 3/2016 | |
|---|---|---|---|
| CN | 205426038 U | 8/2016 | |
| CN | 205991769 U | 3/2017 | |
| CN | 206247998 U | 6/2017 | |
| CN | 208110195 U | 11/2018 | |
| DE | 102012220174 A1 | 5/2014 | |
| EP | 1000890 A2 * | 5/2000 | ......... G01B 11/0691 |
| EP | 2085743 A1 * | 8/2009 | ......... G01B 11/0691 |

* cited by examiner

THICKNESS DETECTOR DEVICE AND METHOD, DETECTOR SYSTEM AND SLOT DEVICE

This application claims the benefit of Chinese patent application No. 201820708727.9 filed on May 11, 2018, which is hereby entirely incorporated by reference as a part of the present application.

TECHNICAL FIELD

Embodiments of the present disclosure relate to a thickness detector device and method, a detector system and a slot device.

BACKGROUND

A liquid crystal display (LCD) includes a liquid crystal display panel and a backlight source provided on one side of the liquid crystal display panel, and the backlight source is used for supplying a light source to the liquid crystal display panel.

The backlight source may usually include a backplane, an adhesive frame and a light guide plate, etc.; after the backlight source is assembled, it is necessary to ensure that a thickness of the backlight source satisfies a design thickness (i.e., a design size); otherwise, there is a risk that the adhesive frame and the backplane in the backlight source are detached from each other. Therefore, after assembly of the backlight source is completed, it is also necessary to perform thickness detection on the backlight source, to remove the backlight source whose thickness does not satisfy the design thickness.

SUMMARY

The embodiments of the present disclosure provide a thickness detector device, a method for performing thickness detection by using the thickness detector device, a detector system including the thickness detector device, and a slot device, and the thickness detector device increases the thickness detection accuracy.

In a first aspect, the embodiments of the present disclosure provide a thickness detector device which includes: a base having a side wall provided with a through slot that penetrates through the base; a slot component which is provided on the base and has n slots, n being an integer greater than 1, and a width of each of the slots being smaller than a width of the through slot; and a driver component which is provided on the base, is in a fixed connection with the slot component, and is configured to change the slot in communication with the through slot by driving the slot component to move.

For example, the base includes a first mounting face provided with the slot component, and the side wall is a face, which is on a side on which an edge of the first mounting face is located, of the base; the base further includes a face opposite to the first mounting face, the through slot penetrates through the first mounting face and the face opposite to the first mounting face, and the through slot has an opening at the side wall.

For example, the through slot penetrates through the base in a thickness direction of the base.

For example, the thickness detector device further includes: a counter, configured to count a number of times of thickness detection performed by the slot in communication with the through slot; the driver component is electrically connected with the counter, and the driver component is configured to: change the slot in communication with the through slot by driving the slot component to move in a situation where the number of times of thickness detection counted by the counter reaches a preset number.

For example, the thickness detector device further includes: an alarm component which is electrically connected with the driver component and the counter, and the alarm component is configured to: issue an alarm signal for indicating that the number of times of thickness detection performed by each of the slots in the slot component reaches the preset number, in a situation where the counter counts out that the number of times of thickness detection reaches the preset number after the driver component drives the slot component to move for n−1 times.

For example, the driver component is further configured to: change the slot in communication with the through slot by driving the slot component to move according to a design thickness of a component to be detected.

For example, the slot component includes a wheel structure; the n slots are evenly distributed at an edge of the wheel structure; and the driver component is configured to drive the slot component to rotate.

For example, the thickness detector device further includes a position limiter component, and the position limiter component is provided in the base; an end of the position limiter component abuts against one slot of the n slots and is configured to limit movement of the slot component in a situation where the driver component is not in operation; and the slot against which the position limiter component abuts is different from the slot in communication with the through slot.

For example, the position limiter component includes a limiting rod and a compression spring; an end of the limiting rod has a sloping surface structure; the sloping surface structure abuts against one slot of the n slots; the sloping surface structure is configured to enable the limiting rod to move in a direction away from the slot component in a situation where the slot component rotates; and the compression spring is configured to drive the limiting rod to abut in another slot adjacent to the one slot in a situation where the slot component stops rotating.

For example, an end that is included by the compression spring and is close to the slot component is in a fixed connection with the limiting rod.

For example, two ends of the compression spring are respectively in a snap connection with two sides of the limiting rod.

For example, the position limiter component includes a limiting rod and a compression spring; the compression spring crosses the limiting rod; an end that is included by the compression spring and is close to the slot component is in a fixed connection with the limiting rod; an end of the limiting rod has a sloping surface structure, and the sloping surface structure abuts against one slot of the n slots.

For example, the driver component includes a gear set and a drive motor, the drive motor is configured to drive the gear set to rotate, and the gear set is in a fixed connection with the slot component.

For example, each of the gear set and the slot component has a positioning groove, and the gear set and the slot component are in a fixed connection by a positioning key.

For example, the base has a first groove for mounting the slot component.

For example, the driver component is on a face, which is included by the base and faces away from the first groove;

the thickness detector device further includes a case, and the case is configured to cover the base, such that the driver component is in the case.

In a second aspect, the embodiments of the present disclosure provide a detector system which includes a carrier base and a thickness detector device, the carrier base is configured to carry a backlight source to be detected, and the thickness detector device is the thickness detector device according to any one of the embodiments in the first aspect.

In a third aspect, the embodiments of the present disclosure provide a thickness detecting method by employing the thickness detector device according to any one of the embodiments described above, and the method includes: selecting the slot of the slot component according to a design thickness of a component to be detected; communicating the slot selected with the through slot; and by moving the component to be detected into the slot selected, judging whether a maximum thickness of the component to be detected is smaller than a slot width of the slot selected.

In a fourth aspect, the embodiments of the present disclosure further provide a slot device which includes: a base; a slot component which is provided on the base and has n slots, n being an integer greater than 1; and a driver component which is provided on the base, is in a fixed connection with the slot component, and is configured to change the slot by driving the slot component to move.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
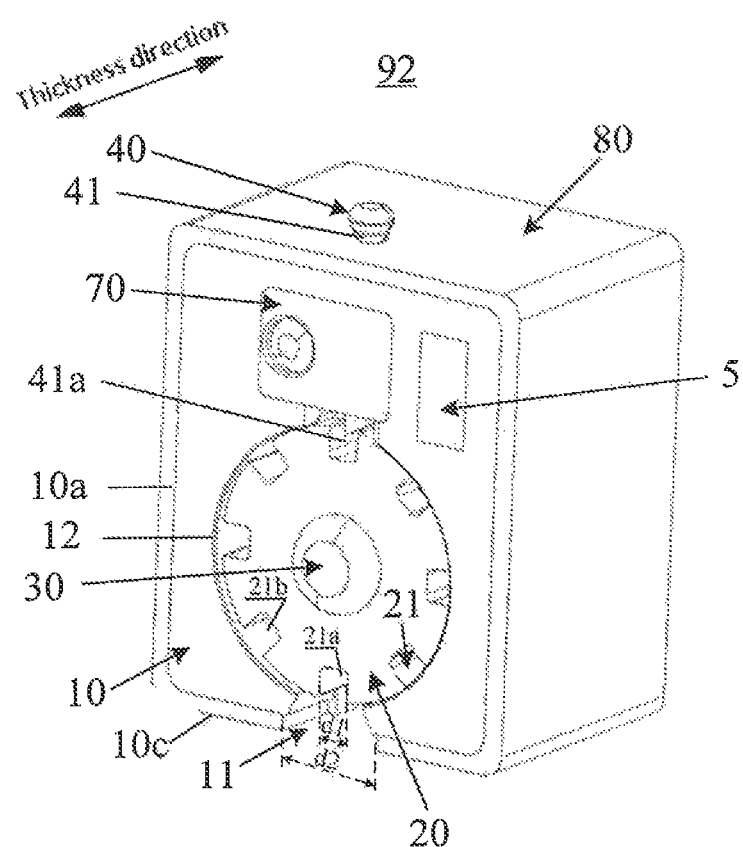
FIG. 1 is a structural schematic view of a thickness detector device provided by the embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At present, a thickness detector device is usually employed to detect a thickness of a backlight source; the thickness detector device is provided with a slot structure, the slot structure includes a through slot, and a width of the through slot matches a design thickness (i.e., a design size) of the backlight source to be detected. When an edge of the backlight source to be detected can pass through the through slot, the thickness of the backlight source to be detected conforms to the design thickness; and when the edge of the backlight source to be detected cannot pass through the through slot, the thickness of the backlight source to be detected does not conform to the design thickness.

In the study, inventors of the present application notice that: in a process of detecting the thickness of the backlight source by employing the thickness detector device, friction is generated between the edge of the backlight source and the slot structure in the thickness detector device, and as the number of times of thickness detection performed by the thickness detector device increases, the slot structure may be worn, causing the width of the through slot included in the slot structure to increase, resulting in lower detection accuracy in subsequent detection.

The embodiments of the present disclosure provide a thickness detector device for detecting a thickness of a component to be detected. Please refer to FIG. 1, FIG. 5 to FIG. 7, which schematically illustrate a structure of the thickness detector device provided by the embodiments of the present disclosure; the thickness detector device 92 may include a base 10, a slot component 20 and a driver component 30; and the slot component 20 and the driver component 30 are both provided on the base 10.

A side wall 10c of the base 10 is provided with a through slot 11, and the through slot 11 penetrates through the base 10. For example, the through slot 11 penetrates through the base 10 in a thickness direction of the base 10. Because a size of the base in the thickness direction is relatively small, by allowing the through slot 11 to penetrate through the base 10 in the thickness direction, it is favorable for improving a speed at which an edge of a component to be detected passes through the through slot 11 and a slot 21, that is, improving thickness detection efficiency. In other embodiments, the through slot 11 may penetrate through a length direction or a width direction of the base 10.

Figure 2:
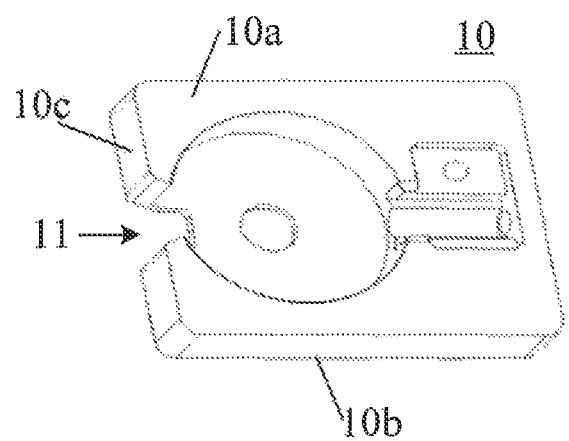
FIG. 2 is a structural schematic view I of a base in the thickness detector device provided by the embodiments of the present disclosure.

For better understanding of the structure of the through slot 11 provided in the base 10, please refer to FIG. 2. FIG. 2 is a structural schematic view of the base 10 in the thickness detector device 92 provided by the embodiments of the present disclosure. As shown in FIG. 1 and FIG. 2, the through slot 11 is in communication with the side wall 10c of the base 10, that is, an opening face of the through slot 11 is located at the side wall 10c of the base 10. It should be noted that, the base 10 includes a first mounting face 10a provided with the slot component 20, and the side wall 10c of the base 10 is a face included by the base 10 and located on a side on which an edge of the first mounting face 10a is located; the base 10 further includes a face 10b opposite to the first mounting face 10a, the through slot 11 penetrates through the first mounting face 10a and the face 10b opposite to the first mounting face 10a, and the through slot 11 is formed with an opening at the side wall 10c (i.e., the through slot 11 is in communication with the side wall 10c).

The slot component 20 has n slots 21, and n is an integer greater than 1; in the embodiments of the present disclosure, the n slots may all have a same size, and a width d1 of each slot 21 is smaller than a width d2 of the through slot 11. In the embodiments of the present disclosure, each type of backlight source (a same type of backlight sources have a same design thickness) correspond to the slots of a same width; and when a different type of backlight source is detected, the slot component 20 in the thickness detector device is replaced, such that the width of the slot 21 in the slot component 20 matches a thickness of the backlight source to be detected. If the thickness detector device is employed to detect the thickness of the backlight source, the through slot 11 is in communication with one slot 21 in the slot component 20, that is, an opening of the slot 21 and an opening of the through slot 11 face a same direction; in the situation where the edge of the backlight source can pass through the slot 21, the thickness of the backlight source conforms to the design thickness (i.e., the design size); and in the situation where the edge of the backlight source cannot pass through the slot 21, the thickness of the backlight source does not conform to the design thickness. It should be noted that, that the edge of the backlight source passes through the slot 21 refers to that: one end of the edge enters the slot 21 from one end of the slot (the one end of the slot is located at one of the faces 10a and 10b), and the edge moves in the slot 21 until the other end of the edge exits the slot 21 from the other end of the slot 21 (the other end of the slot is located at the other of the faces 10a and 10b).

It should be noted that, the thickness detector device provided by the embodiments of the present disclosure not only can be used to detect the thickness of the backlight source, but also can be used to detect a thickness of other component to be detected.

For example, the n slots 21 of the slot component 20 have a same width, so that the n slots are employed to detect a thickness of a same type of backlight sources, that is to say, in a case where any one of the slots 21 cannot be used due to wear, thickness detection can be performed by switching, by the driver component 30, to other slot 21 without replacing the slot component 20. Alternatively, in other embodiments, for example, the n slots 21 of the slot component 20 include slots of different widths, and each width corresponds to a plurality of slots, so that the same slot component 20 is employed to perform thickness detection on a plurality of types of backlight sources without replacing the slot component 20.

The driver component 30 is in a fixed connection with the slot component 20, and the driver component 30 is configured to change the slot 21 that is in communication with the through slot 11 and is in the slot component 20 (e.g., the through slot 11 is in communication with a first slot before changing, then the through slot 11 is in communication with a second slot after the changing, and the first slot and the second slot are different slots among the n slots) by driving the slot component 20 to move. It should be noted that, the fixed connection may be a detachable fixed connection (in which case a connecting part and a connected part are not destroyed when disassembled), such as a threaded connection, a key connection or a snap connection; or, the fixed connection may be a non-detachable fixed connection (in which case the connecting part and the connected part are destroyed when disassembled), such as welding or riveting.

In the embodiments of the present disclosure, if the number of times of thickness detection performed by a certain slot in the thickness detector device is relatively large, the driver component 30 may be employed to change the slot 21 that is in the slot component 20 and is currently in communication with the through slot 11 by driving the slot component 20 to move, so that another slot 21 that is in the slot component 20 and is not performed thickness detection is in communication with the through slot 11. For example, it is assumed that a slot currently in communication with the through slot 11 is a slot 21a, if the number of times of thickness detection performed by employing the slot 21a is relatively large, the slot 21a may be worn, then the driver component 30 is employed to drive the slot component 20 to move, so that another slot 21b that is not performed thickness detection is in communication with the through slot 11, and at this time, the slot 21b may be employed to perform thickness detection on the component to be detected.

For example, the slot component 20 is formed of a material such as plastic, to avoid relatively severe wear on the component to be detected.

In order to increase a degree of automation, the driver component 30 drives the slot component 20 to move in a situation where a certain slot 21 is replaced by other slot 21 due to wear, besides, for example, the driver component 30 is further configured to change the slot 21 that is in the slot component 20 and is in communication with the through slot 11 by driving the slot component 20 to move according to the design thickness (for example, the design thickness may be manually input by an operator) of the component to be detected (for example, the backlight source), and a width of the slot 21 in communication with the through slot 11 after changing corresponds to the design thickness of the component to be detected. That the width of the slot corresponds to the design thickness of the component to be detected refers to that the width of the slot is determined according to the design thickness of the component to be detected. For example, the width of the slot is larger than the design thickness of the component to be detected, so that the component to be detected can enter the slot, and a difference between the width of the slot and the design thickness of the component to be detected is a maximum allowable error of the thickness of the component to be detected.

In summary, the thickness detector device provided by the embodiments of the present disclosure includes the base, and includes the slot component and the driver component which are provided on the base; the slot component has the n slots, and n is an integer greater than 1; the driver component is in the fixed connection with the slot component, and the driver component is configured to change the slot that is in the slot component and is currently in communication with the through slot by driving the slot component to move. If the number of times of thickness detection performed by the slot currently in communication with the through slot on the component to be detected is relatively large, the driver component may be employed to drive the slot component to move, so that the slot not performed thickness detection gets into communication with the through slot, so as to effectively improve detection accuracy. Further, in the thickness detector device, the slot that is in the slot component and is currently in communication with the through slot is changed by the driver component, without frequently replacing the slot structure, which improves efficiency of thickness detection performed on the component to be detected.

Figure 3:
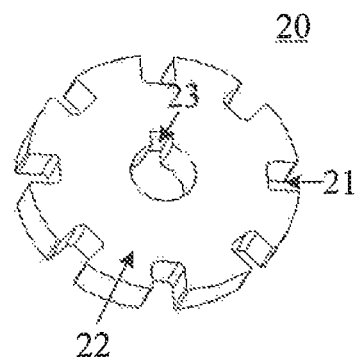
FIG. 3 is a structural schematic view of a slot component in the thickness detector device provided by the embodiments of the present disclosure.

For example, please refer to FIG. 3. FIG. 3 is a structural schematic view of the slot component in the thickness detector device provided by the embodiments of the present disclosure. The slot component 20 may include a wheel structure 22, and the n slots 21 are evenly distributed at an edge of the wheel structure 22; for example, in a situation where n=8, 8 slots 21 are evenly distributed at the edge of the wheel structure 22. The driver component in the thickness detector device is configured to drive the slot component 20 to rotate.

Figure 4:
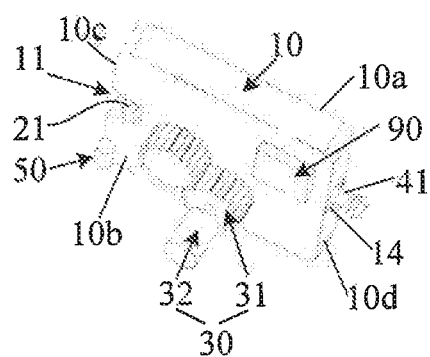
FIG. 4 is a structural schematic view of a driver component in the thickness detector device provided by the embodiments of the present disclosure.

In the embodiments of the present disclosure, types of the driver component may be different. The driver component may be an automatic driver component, or may be a manual driver component, so the above-described driver component drives the slot component to rotate in a plurality of implementable modes. For example, in a situation where the driver component is the manual driver component, the driver component may include a driving wrench, a driving handle or a driving hand wheel, etc.; and if it is necessary to adjust the slot component, the operator may manually rotate the driver component, so that the driver component can drive the slot component to rotate. In the situation where the driver component is the automatic driver component, the driver component can automatically adjust the slot component; and contents below are described in detail with a case where the driver component automatically adjusts the slot component as an example:

Please refer to FIG. 4, FIG. 4 is a structural schematic view of the driver component in the thickness detector device provided by the embodiments of the present disclosure; the driver component 30 may include a drive motor 32, for example, the driver component 30 includes a gear set 31 and the drive motor 32; the drive motor 32 is configured to drive the gear set 31 to rotate, and the gear set 31 is in a fixed connection with the slot component. For example, the slot component may be provided with a positioning groove (for example, the positioning groove 23 in FIG. 3), so as to realize a key connection between the slot component 20 and a drive shaft 33 of the driver component 30; the gear set 31 may also be provided with a positioning groove (not shown in FIG. 4), and the gear set 31 may be in the fixed connected with the slot component through a locating key (not shown in FIG. 4). For example, the gear set 31 includes two meshing spur gears; the drive motor 32 may be in a fixed connection with one of the spur gears in the gear set 31; and the other spur gear in the gear set 31 may be in a fixed connection with the slot component. It should be noted that, FIG. 4 is schematic illustration by taking a case where the gear set 31 includes two meshing spur gears as an example; and in another optional implementation mode, the gear set may include one spur gear, three sequentially meshing spur gears, or more sequentially meshing spur gears, which will not be limited in the embodiments of the present disclosure.

Figure 5:
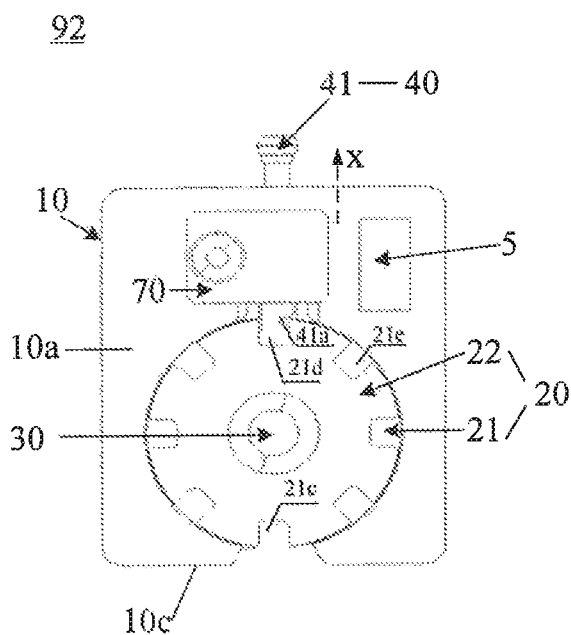
FIG. 5 is a front view of the thickness detector device provided by the embodiments of the present disclosure.

For example, please refer to FIG. 5. FIG. 5 is a front view of the thickness detector device provided by the embodiments of the present disclosure. The thickness detector device may further include a position limiter component 40; the position limiter component 40 is provided in the base 10; one end of the position limiter component 40 abuts against one slot of the n slots 21; and the position limiter component 40 is configured to limit movement of the slot component 20 in a situation where the driver component is not in operation. For example, in a situation where the thickness detector device performs thickness detection on the component to be detected (for example, the backlight source), the position limiter component 40 can limit movement of the slot component 20, so as to ensure that the edge of the component to be detected can smoothly pass through the slot in the thickness detection process of the component to be detected, which reduces a probability that the edge of the component to be detected wears the slot. The slot against which the position limiter component 40 abuts is different from another slot in communication with the through slot 11; for example, it is assumed that the slot currently in communication with the through slot 11 is a slot 21c, and the slot against which the position limiter component 40 abuts is a slot 21d, if the n slots 21 are evenly distributed at the edge of the wheel structure 22, then the slot 21c and the slot 21d may be two opposite slots in a situation where n is an even number.

Figure 6:
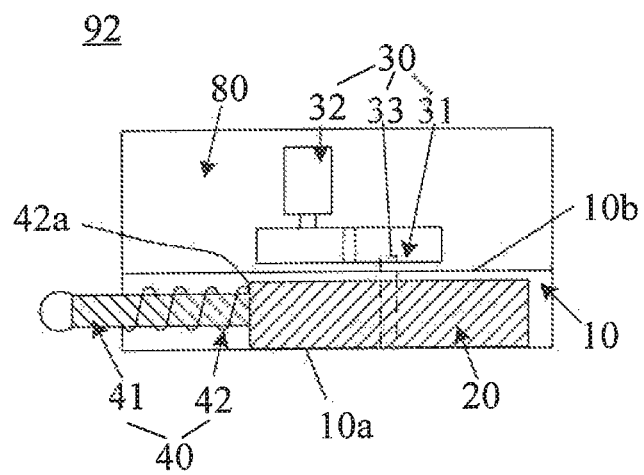
FIG. 6 is a side view of the thickness detector device shown in FIG. 5.

For example, the position limiter component 40 may include a limiting rod 41 and a compression spring (not shown in FIG. 5); for better understanding of a structure of the position limiter component 40, please refer to FIG. 6. FIG. 6 is a side view of the thickness detector device shown in FIG. 5, and the compression spring 42 is passed through by the limiting rod 41. For example, one end 42a that is included by the compression spring 42 and is close to the slot component 20 is in a fixed connection with the limiting rod 41, and another end that is included by the compression spring 42 and is away from the slot component 20 abuts against the base 10. A connection mode of the two ends of the compression spring 42 is not limited to the embodiment shown in FIG. 6; for example, in other embodiments, the two ends of the compression spring 42 are respectively in snap connection with two sides (for example, two ends) of the limiting rod 41. As shown in FIG. 1, FIG. 5 to FIG. 7, one end of the limiting rod 41 is provided with a sloping surface structure 41a, and the sloping surface structure 41a abuts against one slot of the n slots 21. For example, the sloping surface structure 41a is configured to drive the limiting rod 41 to move in a direction x away from the slot component 20 in a situation where the slot component 20 rotates; and the compression spring 42 is configured to drive the limiting rod 41 to abut in a slot adjacent to the one slot in a situation where the slot component 20 stops rotating. For example, the sloping surface structure 41a may abut against the slot 21d; if the slot component 20 rotates under drive of the driver component 30, interaction occurs between the sloping surface structure 41a and a side face of the slot 21d, so that the limiting rod 41 moves in the direction x away from the slot component 20; for example, in the situation where the slot component 20 stops rotating, a slot 21e adjacent to the slot 21d moves to the vicinity of the position limiter component 40, and under an elastic force of the compression spring 42, the limiting rod 41 abuts in the slot 21e.

Figure 7:
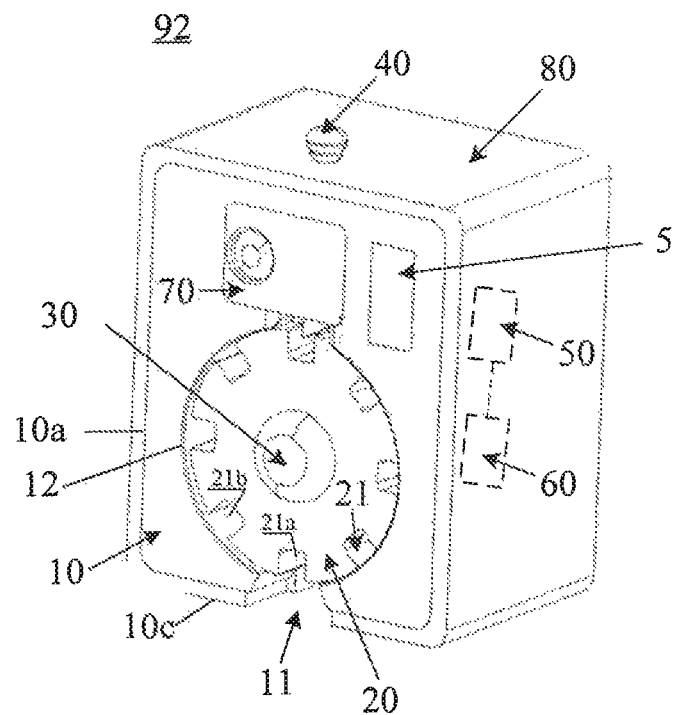
FIG. 7 is another structural schematic view of the thickness detector device provided by the embodiments of the present disclosure.

In the embodiments of the present disclosure, in the situation where the number of times of thickness detection performed by the slot that is in the slot component and is currently in communication with the through slot is relatively large, the slot is changed; and in order to improve changing efficiency, a counter may be provided in the thickness detector device. For example, please refer to FIG. 4 and FIG. 7. FIG. 7 is another structural schematic view of the thickness detector device provided by an embodiment of the present disclosure. The thickness detector device 92 may further include a counter 50; the counter 50 is configured to count the number of times of thickness detection performed by the slot (which may be, for example, the slot 21a) currently in communication with the through slot 21. For example, after the slot 21a performs thickness detection on 1 component to be detected having a certain design thickness, the counter 50 may count out that the number of times of thickness detection performed by the slot 21a is 1; and after the slot 21a performs thickness detection on 100 components to be detected (for example, backlight sources) having the design thickness, the counter 50 may count out that the number of times of thickness detection performed by the slot 21a is 100.

For example, a sensor component may be provided at a groove (hereinafter referred to as a first groove) 12 of the base 10; the sensor component may be an optical signal sensor or a pressure sensor; the sensor component is electrically connected with the counter; in the situation where the thickness detector device is employed to perform thickness detection on the component to be detected (for example, the backlight source), the sensor component can sense that the edge of the component to be detected passes through the slot in the thickness detector device, then the sensor component can generate an induction signal after sensing that the edge of the component to be detected passes through the slot in the thickness detector device, and the sensor component can transmit the generated induction signal to a timer, so that the counter can complete counting of one time of thickness detection based on the induction signal.

For example, as shown in FIG. 4, the base 10 is further provided with a circuit board 90 that is electrically connected with electronic components such as the driver component 30, the counter 50 and the sensor component, to control operational states of these electronic components.

The counter 50 may be electrically connected with the driver component 30, for example, the counter 50 may be electrically connected with the drive motor in the driver component; the driver component 30 is configured to change the slot (which may be, for example, the slot 21a) that is in the slot component 20 and is in communication with the through slot by driving the slot component 20 to move in a situation where the number of times of thickness detection counted by the counter 50 reaches a preset number. For example, the preset number (for example, the preset number may be determined according to a material of the slot) may be 4000; and in a situation where the number of times of thickness detection performed by the slot 21a reaches 4000, the slot 21a may be considered to be damaged, so it is necessary to employ the driver component to drive the slot component 20 to move, so as to change the slot 21a, so that subsequently the thickness of the component to be detected can be detected by employing other slot that does not perform thickness detection. It should be noted that, after changing of the slot is completed by the driver component, the counter 50 may process the number of times of thickness detection recorded to return to zero, so that the counter 50 can re-count the number of times of thickness detection performed by the new slot.

In the embodiments of the present disclosure, in the situation where the number of times of thickness detection counted by the counter 50 reaches the preset number, the counter 50 may send a driving instruction to the drive motor in the driver component; and after the drive motor receives the driving instruction, the drive motor may drive the gear set to rotate, so as to drive the slot component 20 to rotate, until the slot 21b adjacent to the slot 21a gets into communication with the through slot 11. In an embodiment, for example, if the n slots 21 are evenly distributed at the edge of the wheel structure 22, driving time of the drive motor is usually preset; and the drive motor can drive the slot component 20 to rotate by a fixed angle each time the drive motor is in operation, and the fixed angle is an included angle formed by center lines of two adjacent slots.

For example, as shown in FIG. 7, the thickness detector device may further include an alarm component 60; the alarm component 60 is electrically connected with the driver component and counter 50; for example, the alarm component 60 may be electrically connected with the drive motor in the driver component. The alarm component 60 is configured to issue an alarm signal for indicating that the number of times of thickness detection performed by each of the slots in the slot component 20 reaches the preset number, in a situation where the counter 50 counts out that the number of times of thickness detection reaches the preset number after the alarm component 60 detects that the driver component drives the slot component 20 to move n−1 times. For example, it is assumed that n=8, if the alarm component 60 detects that the driver component drives the slot component 20 to move 7 times, and then the counter 50 counts out that the number of times of thickness detection performed by the slot reaches the preset number, in this case, all the slots in the slot component 20 may be worn; if thickness detection is performed by employing the slot component 20, detection accuracy may be lowered, so the alarm component 60 can issue the alarm signal for indicating that the number of times of thickness detection performed by each of the slots in the slot component 20 reaches the preset number, to prompt the operator to replace the slot component in the thickness detector device. For example, the alarm component 60 may be a photoelectric alarm or an electro-acoustic alarm, etc.

For example, as shown in any one of FIG. 1, FIG. 5 to FIG. 7, the thickness detector device 92 may further include a display 5; and the display 5 is configured to display the number of times of thickness detection counted by the counter 50.

Figure 8:
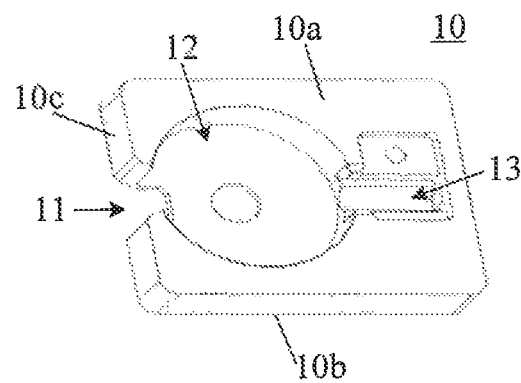
FIG. 8 is a structural schematic view II of the base in the thickness detector device provided by the embodiments of the present disclosure.

For example, please refer to FIG. 8, and FIG. 8 is a structural schematic view of the base 10 provided by the embodiments of the present disclosure. The base 10 is further provided with the first groove 12 for mounting the slot component, that is, the first mounting face 10a where the slot component is located is provided with the first groove 12. For example, the base 10 is further provided with a second groove 13 for mounting the position limiter component. For example, as shown in FIG. 4, the second groove 13 is formed with an opening 14 at a face 10d of the base 10, and the limiting rod 41 passes through the opening 14. For example, the second groove 13 is also provided at the first mounting face 10a.

For example, as shown in FIG. 1, FIG. 5 or FIG. 7, the thickness detector device 92 may further include a cover plate 70; and the cover plate 70 is mounted at the second groove 13, for preventing the position limiter component 40 in the second groove from falling off. For example, the cover plate 70 is a transparent cover plate to facilitate observation of a condition of the position limiter component 40.

For example, as shown in FIG. 4 or FIG. 6, the driver component 30 is provided at the face 10b, which is included by the base 10 and faces away from the first groove 12 and the second groove 13 (in this case, the face 10b is a second mounting face), that is, the driver component 30 and the slot component 20 are respectively mounted at the two mounting faces (i.e., the first mounting face 10a and the second mounting face 10b) of the base 10.

For example, as shown in any one of FIG. 1, FIG. 5 to FIG. 7, the thickness detector device 92 may further include a case 80; and the case 80 is configured to cover the base 10, such that the driver component 30 is located in the case 80. The driver component 30 may be prevented by the case 80 from falling off the base 10.

In summary, the thickness detector device provided by the embodiments of the present disclosure includes the base, and includes the slot component and the driver component which are provided on the base; the slot component has the n slots, and n is an integer greater than 1; the driver component is in the fixed connection with the slot component, and the driver component is configured to change the slot that is in the slot component and is in communication with the through slot by driving the slot component to move. If the number of times of thickness detection performed by the slot on the component to be detected is relatively large, the driver component may be employed to drive the slot component to move, so that the slot that has not performed thickness detection gets into communication with the through slot, so as to effectively improve detection accuracy. Further, in the thickness detector device, the slot that is in the slot component and is currently in communication with the through slot is changed by the driver component, without frequently replacing the slot structure with respect to a related art, which improves efficiency of thickness detection performed on the component to be detected.

Figure 9:
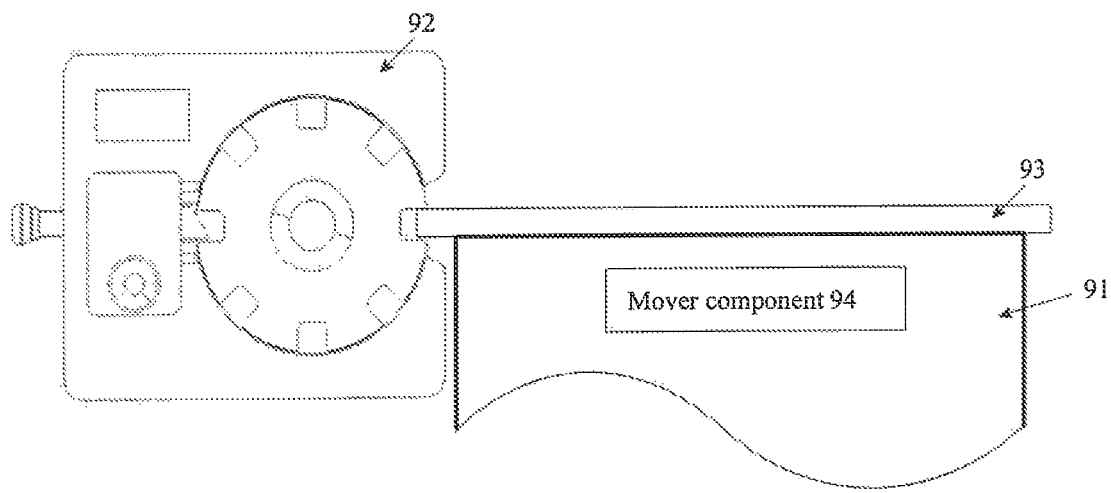
FIG. 9 is a structural schematic view of a detector system provided by the embodiments of the present disclosure.

The embodiments of the present disclosure provide a detector system, please refer to FIG. 9, and FIG. 9 is a structural schematic view of the detector system provided by the embodiments of the present disclosure; the detector system may include a carrier base 91 and a thickness detector device 92; and the thickness detector device 92 may be the thickness detector device shown by any one of FIG. 1, FIG. 5 to FIG. 7. The carrier base 91 is configured to carry the component to be detected (for example, a backlight source) 93. For example, the detector system may further include: a mover component 94; and the mover component 94 is used for driving the carrier base 91 to move, such that the edge of the component to be detected 93 carried by the carrier base 91 passes through the slot 21 in the thickness detector device 92. For example, the mover component 94 is configured to drive the carrier base 91 to rotate, so that a plurality of edges of the component to be detected 93 pass through the slot 21 one by one.

The embodiments of the present disclosure further provide a thickness detecting method by employing the thickness detector device provided by any one of the above-described embodiments, the method including steps S1 to S3 below.

Step S1: selecting a slot of the slot component according to the design thickness of the component to be detected. As described above, the width of the slot is determined according to the design thickness of the component to be detected, so that a suitable slot is selected for detection according to the design thickness in the thickness detection process. For example, the component to be detected is a backlight source or other device that requires thickness detection.

Step S2: communicating the selected slot with the through slot. Referring to the above-described embodiments about the thickness detector device, the driver component is employed to drive the slot component to move, so as to enable the slot to be in communication with the through slot and realize changing between slots.

Step S3: judging whether a maximum thickness of the component to be detected is smaller than a slot width of the selected slot by moving the component to be detected into the selected slot. If the component to be detected can be moved into the slot, the thickness of the component to be detected conforms to requirements. For example, whether the thickness of the component to be detected conforms to the requirements is detected by allowing one or more edges of the component to be detected to pass through the slot to detect.

Figure 10:
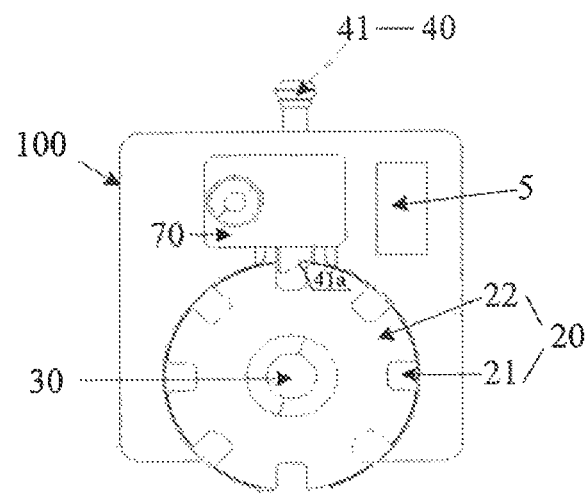
FIG. 10 is a structural schematic view of a slot device provided by the embodiments of the present disclosure.

The embodiments of the present disclosure further provide a slot device; and as shown in FIG. 10, the slot device includes a base 100, the slot component 20 and the driver component 30. The slot component 20 is provided on the base 100, the slot component 20 has the n slots 21, and n is an integer greater than 1. The driver component 30 is provided on the base 100; the driver component 30 is in the fixed connection with the slot component 20; and the driver component 30 is configured to change the slot 21 in the slot component 20 by driving the slot component 20 to move.

For example, the base 100 is provided with a through slot penetrating through the base 100; for example, the through slot extends in a thickness direction of the base 100, in which case the base 100 is provided in a same manner as the base 10 in the above-described embodiment. In other embodiments, the base 100 may not be provided with the through slot, in which case, for example, the component to be detected may pass through the slot 21, just by allowing an orthographic projection of the slot 21 currently used on the base 100 to be located outside a region where the base 100 is located.

For example, the driver component 30 and the slot component 20 in the slot device may be provided in the manner of corresponding components in the above-described embodiments about the thickness detector device; for example, the slot device may further include at least one or more of the structures such as the position limiter component 40, the counter 50, the alarm component 60, the cover plate 70, the case 80, the circuit board 90 and the display 5 as mentioned in the embodiments of the thickness detector device, and the description thereof will not be repeated.

The slot device provided by the embodiments of the present disclosure may be used in thickness detection or other situation where a slot needs to be used.

In summary, in the thickness detector device, the thickness detecting method, the detector system and the slot device provided by the embodiments of the present disclosure, the slot component has a plurality of slots of a same width, the driver component is configured to change the slot that is in the slot component and is currently in communication with the through slot by driving the slot component to move; and if the number of times of thickness detection performed by the slot currently in communication with the through slot on the component to be detected is relatively large, the driver component may be employed to drive the slot component to move, so that another slot having not performed thickness detection gets into communication with the through slot, so as to effectively improve detection accuracy. Further, in the thickness detector device, the slot that is in the slot component and is currently in communication with the through slot is changed by the driver component, without frequently replacing the slot structure, which improves efficiency of thickness detection performed on the component to be detected.

What are described above is related to the illustrative embodiments of the disclosure only and not limitative to the scope of the disclosure; the scopes of the disclosure are defined by the accompanying claims.

What is claimed is:

1. A thickness detector device, comprising:
   a base, wherein a side wall of the base is provided with a through slot, and the through slot penetrates through the base;
   a slot component, wherein the slot component is provided on the base, the slot component has n slots, n is an integer greater than 1, and a width of each of the slots is smaller than a width of the through slot; and
   a driver component, wherein the driver component is provided on the base, the driver component is in a fixed connection with the slot component, and the driver component is configured to change the slot in communication with the through slot by driving the slot component to move.

2. The thickness detector device according to claim 1, wherein
   the base comprises a first mounting face provided with the slot component, and the side wall is a face, which comprises an edge of the first mounting face, of the base;
   the base further comprises a face opposite to the first mounting face, the through slot penetrates through the first mounting face and the face opposite to the first mounting face, and the through slot has an opening at the side wall.

3. The thickness detector device according to claim 2, wherein the through slot penetrates through the base in a thickness direction of the base.

4. The thickness detector device according to claim 1, further comprising:
   a counter, configured to count a number of times of thickness detection performed by the slot in communication with the through slot;
   wherein the driver component is electrically connected with the counter, and the driver component is configured to: change the slot in communication with the through slot by driving the slot component to move in a situation where the number of times of thickness detection counted by the counter reaches a preset number.

5. The thickness detector device according to claim 4, further comprising:
   an alarm component, wherein the alarm component is electrically connected with the driver component and the counter, and the alarm component is configured to: issue an alarm signal for indicating that the number of times of thickness detection performed by each of the slots in the slot component reaches the preset number, in a situation where the counter counts out that the number of times of thickness detection reaches the preset number after the driver component drives the slot component to move for n-1 times.

6. The thickness detector device according to claim 1, wherein the driver component is further configured to: change the slot in communication with the through slot by driving the slot component to move according to a design thickness of a component to be detected.

7. The thickness detector device according to claim 1, wherein
   the slot component comprises a wheel structure;
   the n slots are evenly distributed at an edge of the wheel structure; and
   the driver component is configured to drive the slot component to rotate.

8. The thickness detector device according to claim 7, further comprising:
   a position limiter component, wherein the position limiter component is provided in the base;
   an end of the position limiter component abuts against one slot of the n slots and is configured to limit movement of the slot component in a situation where the driver component is not in operation; and
   the slot against which the position limiter component abuts is different from the slot in communication with the through slot.

9. The thickness detector device according to claim 8, wherein
   the position limiter component comprises a limiting rod and a compression spring; the limiting rod passes through the compression spring; an end of the limiting rod has a sloping surface structure; the sloping surface structure abuts against one slot of the n slots; the sloping surface structure is configured to enable the limiting rod to move in a direction away from the slot component in a situation where the slot component rotates; and the compression spring is configured to drive the limiting rod to abut in another slot adjacent to the one slot in a situation where the slot component stops rotating.

10. The thickness detector device according to claim 9, wherein an end that is comprised by the compression spring and is close to the slot component is in a fixed connection with the limiting rod.

11. The thickness detector device according to claim 9, wherein two ends of the compression spring are respectively in a snap connection with two sides of the limiting rod.

12. The thickness detector device according to claim 1, further comprising:
   a position limiter component, wherein the position limiter component is provided in the base; an end of the position limiter component abuts against one slot of the n slots and is configured to limit movement of the slot component in a situation where the driver component is not in operation; and the slot against which the position limiter component abuts is different from the slot in communication with the through slot.

13. The thickness detector device according to claim 12, wherein
   the position limiter component comprises a limiting rod and a compression spring; the limiting rod passes through the compression spring; an end that is comprised by the compression spring and is close to the slot component is in a fixed connection with the limiting rod; an end of the limiting rod has a sloping surface structure, and the sloping surface structure abuts against one slot of the n slots.

14. The thickness detector device according to claim 1, wherein the driver component comprises a gear set and a drive motor, the drive motor is configured to drive the gear set to rotate, and the gear set is in a fixed connection with the slot component.

15. The thickness detector device according to claim 14, wherein
each of the gear set and the slot component has a positioning groove, and the gear set and the slot component are in a fixed connection by a positioning key.

16. The thickness detector device according to claim 1, wherein the base has a first groove for mounting the slot component.

17. The thickness detector device according to claim 16, wherein the driver component is on a face, which is comprised by the base and faces away from the first groove;
the thickness detector device further comprises a case, and the case is configured to cover the base, such that the driver component is in the case.

18. A detector system, comprising:
a carrier base, configured to carry a component to be detected, and
a thickness detector device, which is the thickness detector device according to claim 1 and is configured to detect a thickness of the component to be detected.

19. A thickness detecting method by employing a thickness detector device, wherein
the thickness detector device comprises a base, a slot component and a driver component; a side wall of the base is provided with a through slot, and the through slot penetrates through the base; the slot component is provided on the base, the slot component has n slots, n is an integer greater than 1, and a width of each of the slots is smaller than a width of the through slot; the driver component is provided on the base, the driver component is in a fixed connection with the slot component, and the driver component is configured to change the slot in communication with the through slot by driving the slot component to move;
the method comprises:
selecting the slot of the slot component according to a design thickness of a component to be detected;
communicating the slot selected with the through slot; and
by moving the component to be detected into the slot selected, judging whether a maximum thickness of the component to be detected is smaller than a slot width of the slot selected.

20. A slot device, comprising:
a base;
a slot component, wherein the slot component is provided on the base, the slot component has n slots, and n is an integer greater than 1; and
a driver component, wherein the driver component is provided on the base, the driver component is in a fixed connection with the slot component, and the driver component is configured to change the slot by driving the slot component to move.

* * * * *